May 3, 1938.   F. B. LOMAX   2,115,728
PROCESS OF FILTERING EGGS
Original Filed Jan. 26, 1935
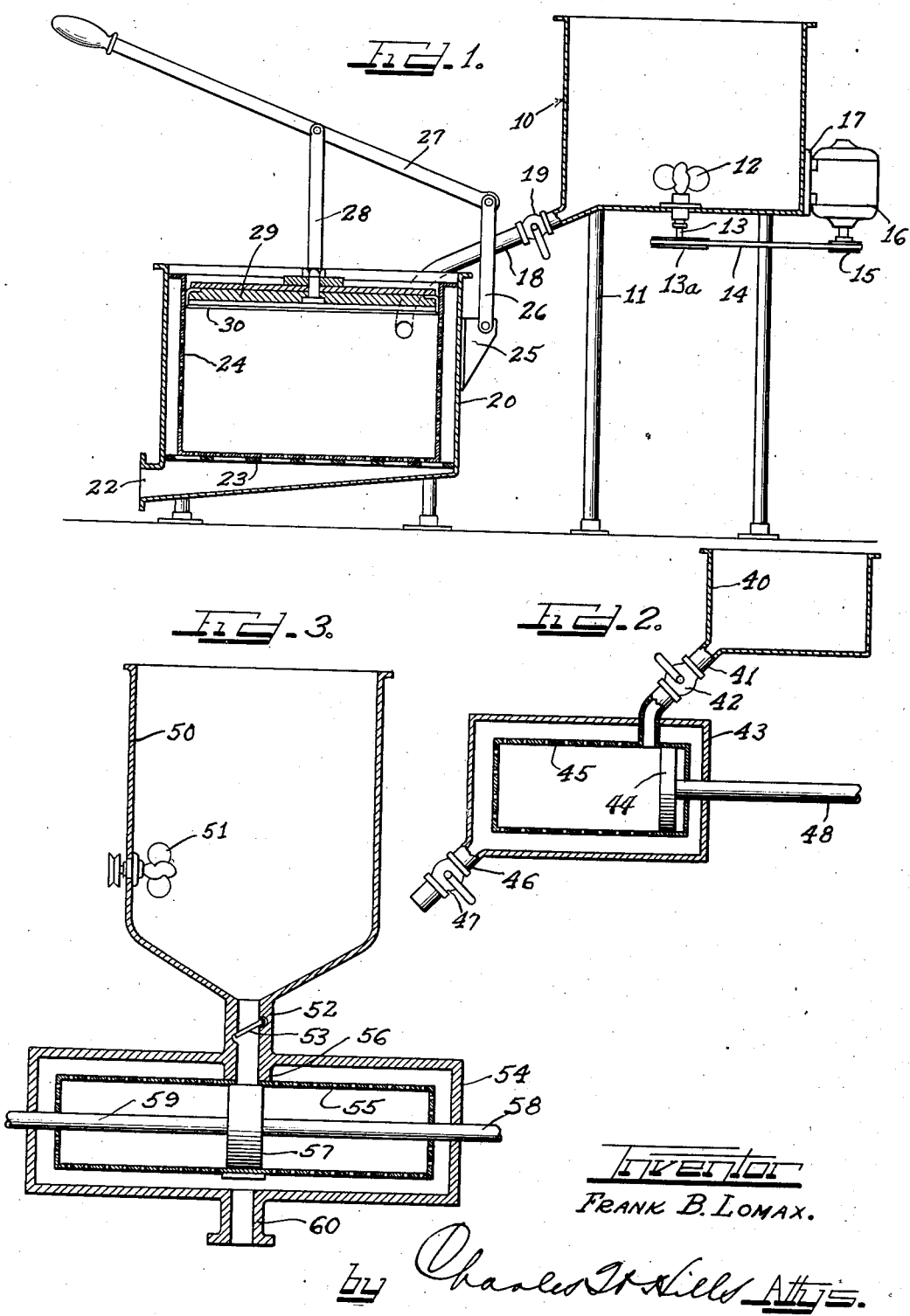
Inventor
FRANK B. LOMAX.
by Charles H. Hills Attys.

Patented May 3, 1938

2,115,728

UNITED STATES PATENT OFFICE 2,115,728

PROCESS OF FILTERING EGGS

Frank B. Lomax, Chicago, Ill.

Original application January 26, 1935, Serial No. 3,602. Divided and this application May 7, 1936, Serial No. 78,337

4 Claims. (Cl. 99—113)

This invention relates to filtering of eggs to free the eggs from fragments of egg shell, unbroken chalaza, lumps, dirt, and the like.

More specifically this invention relates to the mechanical forcing of egg meats through a perforate container adapted to withhold shell fragments, lumps, and unbroken chalaza.

This application is a division of my copending application filed January 26, 1935, entitled "Apparatus for filtering eggs", Serial No. 3,602.

It has long been the aim of egg canners to produce frozen egg meats or canned eggs free from foreign matter such as egg shells, dirt, and hard fibrous parts of the yolk sac. It has been a further aim of egg canners to thoroughly mix the egg meats so as to produce a product of uniform color and texture without, however, at the same time causing the mass to foam because of air being incorporated therein.

According to the present process broken egg material is uniformly mixed without incorporating air therein. The so-mixed mass is then filtered without the aid of pumps or the like for propelling the mass through the filter.

It is then an object of this invention to provide a process of filtering egg meats to free the same from shell fragments, unbroken chalaza, dirt, lumps and the like without waste of the egg material and without the production of foamy masses.

A further object of this invention is to provide a process of filtering egg material directly through a perforated basket acting as a filter medium without the aid of pumps for propelling the mass through the filter.

Another object of this invention is to provide a process of filtering eggs through a perforated basket by a pressure producing member which will disintegrate the chalaza to a filterable size.

Other and further objects of this invention will become apparent from the following description of the annexed sheet of drawings which discloses types of apparatus suitable for carrying out the process of this invention.

On the drawing:

Figure 1 is a vertical cross-sectional view, with parts in elevation, of an egg receiving chamber, an egg filter, a plunger associated with the filter and means for operating the plunger.

Figure 2 is a vertical cross-sectional view, with parts in elevation, of a modified form of apparatus.

Figure 3 is a vertical cross-sectional view, with parts in elevation, of another modified form of apparatus in which the egg receiving chamber is provided with a double acting reciprocating plunger.

As shown on the drawing:

Figure 1 illustrates an egg receiving tank 10 of any suitable construction supported upon legs 11 or other suitable supports and having a mixing propeller 12 in or at the bottom thereof mounted upon a shaft 13 driven from a motor 16 through pulleys 13a and 15 by a belt 14 entrained around the pulleys. The motor 16 can be suitably secured to the tank 10 by means of a bracket 17.

A conduit 18 having a valve 19 therein is provided for draining the contents of the tank 10 into a filter or perforated basket 24. The basket 24 is mounted in a tank 20 with a discharge orifice 22 at its lowermost level.

A grilled support member 23 is mounted across the bottom of the tank 20 in spaced relation from the bottom thereof for receiving the basket 24 thereon. The basket 24 is removably seated on the support 23 within the tank 20 and comprises a perforated metal sheet or a reinforced wire screen, the perforations of which are of such size that will withhold fragments of egg shell, will disintegrate chalaza, break up or filter out meat balls and separate other hard or fibrous substances from the egg material. If desired the bottom of the basket may be imperforate in which event all the filtered material passes through the side walls of the basket.

A bracket 25 is mounted upon the side of the tank 20 and has a link 26 pivoted thereto. A lever 27 is pivoted to the link 26 and operates a second link 28 to which is secured a piston or plunger 29 having forwardly projecting peripheral flanges 30 for snugly sliding against the side walls of the basket 24. The flanges 30 may be of flexible material or of a rigid metal.

The operation of the device is as follows:

Shelled egg meats, either whole eggs, egg whites, or egg yolks are deposited in the tank 10. The mixing propeller 12 is set in motion to uniformly mix the egg meats. The plunger 29 in the basket 24 is raised to a position above the end of the conduit 18 leading from the tank 10. The valve 19 is opened to drain the egg meats from the tank 10 into the basket 24 until the basket is filled to a desired height. The valve 19 is then closed and the plunger 29 is forced down by operating the lever 27. The egg material is thus forced through the perforate basket 24 as the plunger moves toward the bottom of the basket. The filtered material drains to the bottom of the basket and is collected for storage at the discharge end 22 thereof.

The flanges 30 upon the scraper 29 scrape material which adheres to the interior wall of the basket 24 and cutting off any material such as chalaza which partly extends through the perforations therein from those portions of the material which remain in the filter. Those portions which have passed partly through the perforations are then free to pass completely through. Thus, at all times, the walls of the filter are kept clean and any material which will not pass through the filter is collected upon the bottom of the basket which is not subjected to the scraping and cleansing action of the flanges 30 of the plunger 29.

When the first charge of material is forced out of the basket 24 the lever 27 is raised, the valve 19 is again opened to recharge the basket with material from the tank 10 and the operation is repeated. The basket may be removed whenever desired for cleaning or replacing.

In the form of apparatus illustrated in Figure 2 a tank 40 which may have a mixing propeller (not shown) therein is provided with a drain conduit 41 at the bottom thereof having a valve 42 therein for controlling the drainage from the tank 40.

The drain line 42 extends through a housing 43 and terminates in a perforated basket or chamber 45 having a piston 44 reciprocally mounted therein. Material is forced thru the perforations of the basket 45 by the piston 44 and collected in the housing 43 surrounding the basket. The housing 43 is drained through a drain conduit 46 controlled by a valve 47. The piston 44 is energized through a piston rod 48 extending through both the basket 45 and the housing 43.

In the operation of the device shown in Figure 2 the egg material is deposited in the tank 40 where it can be thoroughly mixed as described in connection with Figure 1. The plunger or piston 44 is then drawn to the extreme right, the valve 42 is opened to permit egg material to drain from the tank 40 into the basket 45. The valve is then closed and the plunger 44 is moved to the left to force egg material through the perforations in the basket 45. The filtered egg material can be drained through the conduit 46 by controlling the valve 47 thereof.

In the embodiment of the apparatus disclosed in Figure 3 the reference numeral 50 indicates a tank for receiving the egg material. A mixing propeller 51 is disposed in the tank for stirring the egg material into a uniform mass. The tank is preferably provided with a sloping bottom having a drain 52 communicating with the lowermost portion thereof. A check valve 53 is mounted in the drain conduit 52.

Beneath the tank 50 a housing 54 is provided for containing an elongated perforate basket 55 or two abutting open topped perforate baskets spaced from the inner walls of the housing. The basket 55 has an aperture in the center thereof registering with an annular boss or lug 56 formed on the inner wall of the housing in communication with the drain conduit 52 from the tank 50. The conduit 52 thus empties into the basket 55.

A plunger or piston 57 having two operating handles or rods 58 and 59 is reciprocally mounted within the elongated basket 55 and is movable substantially the length of the basket.

Opposite sides of the plunger 57 include scraping edges such as have been described in connection with the plunger 29 of Figure 1. A discharge conduit 60 is provided at the bottom of the housing 54 for drainage of filtered egg material therethrough.

With the plunger in position shown in Figure 3 no egg material will be discharged into the filter. However, if the plunger is moved either to the right or to the left of the position shown in Figure 3 egg material will flow from the tank 50 into the basket 55 behind the piston. As the plunger moves the interior of the basket is scraped along the side walls thereof to force egg material through the screen.

As the plunger moves from the midportion of the basket to one end thereof that portion of the basket behind the plunger is filled with egg material from the tank 50 while the egg material ahead of the plunger is forcibly ejected through the other half portion of the screen. This cycle will continue as long as egg material remains in the tank 50 and the plunger is actuated as described.

From the above descriptions of the illustrated apparatus it should be understood that the broken egg material collected in the receiving tanks or hoppers containing either the whole eggs, egg yolks, or egg whites together with admixed shell fragments, chalaza, dirt, lumps and the like are uniformly mixed by an agitating device acting from below the level of the mass in the tanks. After the mixing has progressed to a satisfactory point the drain conduits of these tanks are opened to discharge some or all of the mixed mass into filter baskets. Plungers or pistons provided in the filter baskets are actuated to forcibly eject the egg meats through the filter into a receptacle surrounding the filter from which receptacle the filtered meats are drawn off for storage and/or freezing.

By causing the plunger to act as a scraper and by forcing the egg meats through the walls of the filter these walls are cleaned simultaneous with the forcible ejection of the egg meats. By depositing the unfiltered portion on the bottom of the filter or at the ends of the filter where this portion can drain or be compressed on the next stroke of the plunger, the unfiltered egg shell fragments are not pulverized or forcibly ejected through the filter. The process dispenses entirely with the use of a pump for transferring the egg meats from one container to another and therefore no unnecessary superatmospheric pressure is used upon the material and the egg meats are not unnecessarily churned.

I am aware that numerous details of the process may be varied through a wide range without departing from the principles of this invention, and I, therefore, do not purpose limiting the patent granted hereon otherwise than necessitated by the prior art.

I claim as my invention:

1. The process of filtering eggs which comprises collecting a mass of broken egg material containing egg meats, chalaza, shell fragments, lumps and the like in a perforate container, compressing the mass to force egg meats through the perforations of the container while retaining the shell fragments, lumps and the like within the container, and scraping the container walls during the compression step to clean said walls and disintegrate chalaza collected thereon for passage therethrough.

2. The process of filtering eggs which comprises flowing by gravity a mass of egg material containing egg meats, shell fragments, chalaza and the like into a perforated basket, compressing the mass in said basket to force the egg meats through the perforations therein while retaining the unbroken chalaza and shell fragments within the basket and simultaneously cutting off those portions of chalaza passed partly through the perforations in the basket from the parts remaining in the basket to permit said chalaza portions to completely pass through the perforations.

3. The process of filtering eggs which comprises flowing by gravity a mass of broken egg material containing egg meats, shell fragments, chalaza and the like into a container having perforated side walls, stopping said flow when a desired amount of the mass is collected in the container, advancing a member into the container to compress the mass therein and force the egg meats through the perforated walls of the container while retaining the shell fragments, chalaza and the like within the container, simultaneously scraping the side walls of the container to clean the same and cut off those portions of chalaza passed partly through the walls from the parts within the container to permit complete passage of said portions through the perforations, retracting said member and repeating said flowing, advancing, scraping and retracting operations.

4. The process of filtering eggs which comprises flowing a mass of broken egg material containing egg meats, shell fragments, chalaza and the like into a perforate container to substantially fill the container, stopping said flow, compressing the mass to force the egg meats through the perforations of the container while retaining the shell fragments and chalaza therein, simultaneously scraping the perforate walls of the container to clean the same and cut off portions of chalaza passed partly through the perforations from the parts within the container to permit complete passage of said portions through the perforations, releasing the compression, flowing by gravity another mass of broken egg material into the container and repeating said compressing, scraping and releasing operations.

FRANK B. LOMAX.